United States Patent
Hong et al.

(10) Patent No.: US 12,433,533 B2
(45) Date of Patent: Oct. 7, 2025

(54) METHOD, COMPUTING APPARATUS, AND COMPUTER PROGRAM FOR ANALYZING SLEEPING STATE OF USER THROUGH SOUND INFORMATION

(71) Applicant: ASLEEP CO., LTD, Seoul (KR)

(72) Inventors: Junki Hong, Daejeon (KR); Hong Hai Tran, Seoul (KR); Jinhwan Jung, Daejeon (KR); Dongheon Lee, Seongnam-si (KR)

(73) Assignee: ASLEEP CO., LTD (KR)

( * ) Notice: Subject to any disclaimer, the term of this patent is extended or adjusted under 35 U.S.C. 154(b) by 0 days.

(21) Appl. No.: 18/287,969

(22) PCT Filed: Dec. 30, 2022

(86) PCT No.: PCT/KR2022/021760
§ 371 (c)(1),
(2) Date: Oct. 23, 2023

(87) PCT Pub. No.: WO2023/128713
PCT Pub. Date: Jul. 6, 2023

(65) Prior Publication Data
US 2024/0081730 A1   Mar. 14, 2024

(30) Foreign Application Priority Data

Dec. 31, 2021   (KR) .................. 10-2021-0194186

(51) Int. Cl.
*A61B 5/00* (2006.01)
*A61B 7/04* (2006.01)
(Continued)

(52) U.S. Cl.
CPC .......... *A61B 5/4812* (2013.01); *A61B 5/7267* (2013.01); *A61B 7/04* (2013.01);
(Continued)

(58) Field of Classification Search
None
See application file for complete search history.

(56) References Cited

U.S. PATENT DOCUMENTS 6,290,654 B1 *   9/2001   Karakasoglu .......... A61B 7/003
                                                                600/529
2002/0106091 A1 *   8/2002   Furst ..................... H04R 19/04
                                                                381/91

(Continued)

FOREIGN PATENT DOCUMENTS

CN       111904424 A    11/2020
JP        5662373 B2     1/2015

(Continued)

OTHER PUBLICATIONS

Jung Kyung Hong et at. "Confidence-Based Framework Using Deep Learning for Automated Sleep Stage Scoring" Nature and Science of Sleep, Published: Dec. 24, 2021, Nature and Science of Sleep 2021:13 2239-2250.

(Continued)

*Primary Examiner* — Jason M Sims
*Assistant Examiner* — Matthew Eric Ogles
(74) *Attorney, Agent, or Firm* — The Belles Group, P.C.

(57) ABSTRACT

A method for analyzing a user's sleep state based on sound information for realizing the above-described tasks is disclosed. The method comprises the steps of acquiring sleep sound information related to the user's sleep, pre-processing the sleep sound information, and acquiring sleep state information by analyzing the pre-processed sleep sound information, wherein the sleep state information may include sleep stage information related to the user's sleep depth.

20 Claims, 5 Drawing Sheets

(51) Int. Cl.
*G10L 25/18* (2013.01)
*G10L 25/66* (2013.01)
*H04R 19/04* (2006.01)

(52) U.S. Cl.
CPC .............. *G10L 25/18* (2013.01); *G10L 25/66* (2013.01); *H04R 19/04* (2013.01); *H04R 2201/003* (2013.01)

(56) References Cited

U.S. PATENT DOCUMENTS

| | | | |
|---|---|---|---|
| 2004/0240699 A1* | 12/2004 | Hasegawa | H04R 19/04 381/361 |
| 2006/0017558 A1* | 1/2006 | Albert | G08B 3/10 340/521 |
| 2007/0041596 A1* | 2/2007 | Pan | H04R 19/04 381/174 |
| 2015/0315013 A1* | 11/2015 | Hsieh | H04R 19/005 257/416 |
| 2016/0187856 A1 | 6/2016 | Vilermo et al. | |
| 2016/0212542 A1* | 7/2016 | Wang | H04R 7/16 |
| 2019/0320972 A1 | 10/2019 | Tribble et al. | |
| 2020/0054289 A1* | 2/2020 | Shimol | A61B 5/7253 |
| 2020/0138366 A1* | 5/2020 | Low | A61B 5/316 |
| 2020/0296513 A1* | 9/2020 | Littrell | G01R 19/02 |
| 2020/0315368 A1* | 10/2020 | Tsern | G05B 13/0265 |
| 2021/0275056 A1* | 9/2021 | McMahon | A61B 5/11 |
| 2022/0134050 A1* | 5/2022 | Moriyasu | A61B 5/7275 600/27 |
| 2022/0322998 A1* | 10/2022 | Wang | A61B 5/08 |
| 2023/0190140 A1* | 6/2023 | Tiron | A61B 5/746 600/534 |

FOREIGN PATENT DOCUMENTS

| | | |
|---|---|---|
| KR | 20030032529 A | 4/2003 |
| KR | 20160096905 A | 8/2016 |
| KR | 20170057038 A | 5/2017 |
| KR | 20180014417 A | 2/2018 |
| KR | 10-2018-0075832 A | 7/2018 |
| KR | 20180096176 A | 8/2018 |
| KR | 20190114925 A | 10/2019 |
| KR | 102081241 | 2/2020 |
| KR | 20200129426 A | 11/2020 |
| KR | 20200139049 A | 12/2020 |
| KR | 102429256 B1 | 8/2022 |
| WO | 2011010384 A1 | 1/2011 |

OTHER PUBLICATIONS

Korean Office Action10-2022-0095338 Issued Dec. 2, 2022.
Korean Office Action 10-2023-0089780, Issued on Oct. 18, 2023.
Japanese Office Action 2023-557252, Issued Jun. 5, 2024.
Japanese Office Action 2023-169644, Issued Jul. 9, 2024.
Japanese Office Action 2023-169644 , Issued on Dec. 24, 2024.

* cited by examiner

[FIG. 1]
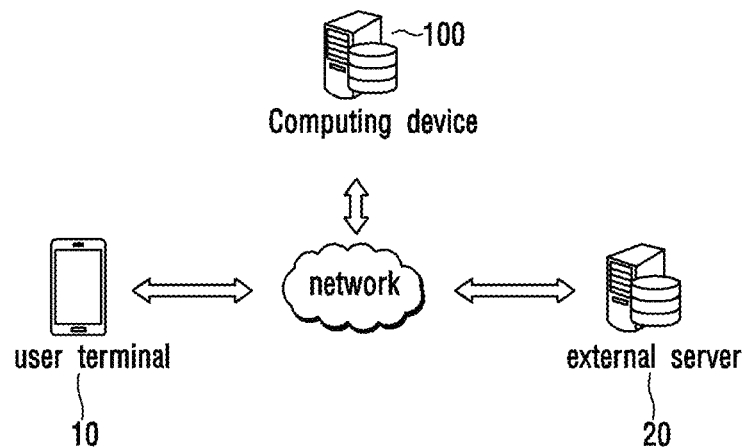
[FIG.2]
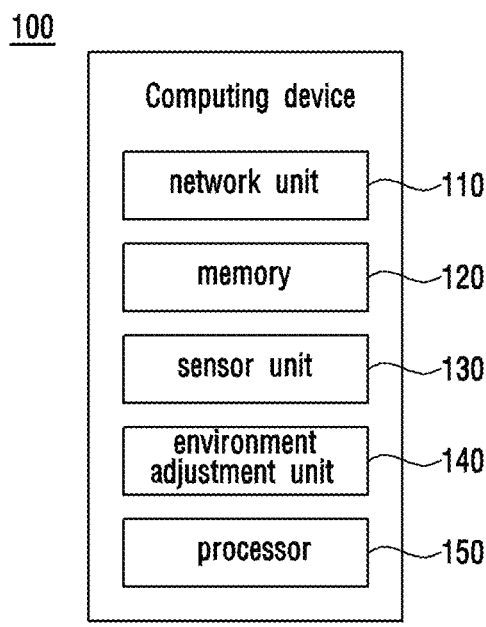
[FIG. 3]
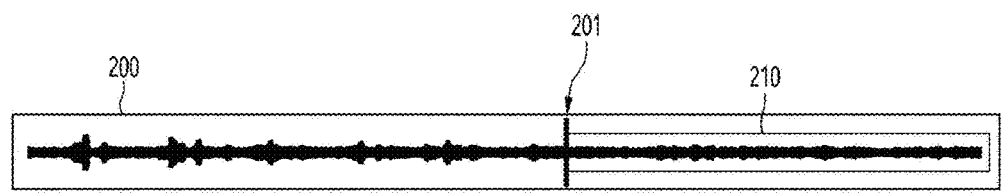

[FIG. 4]
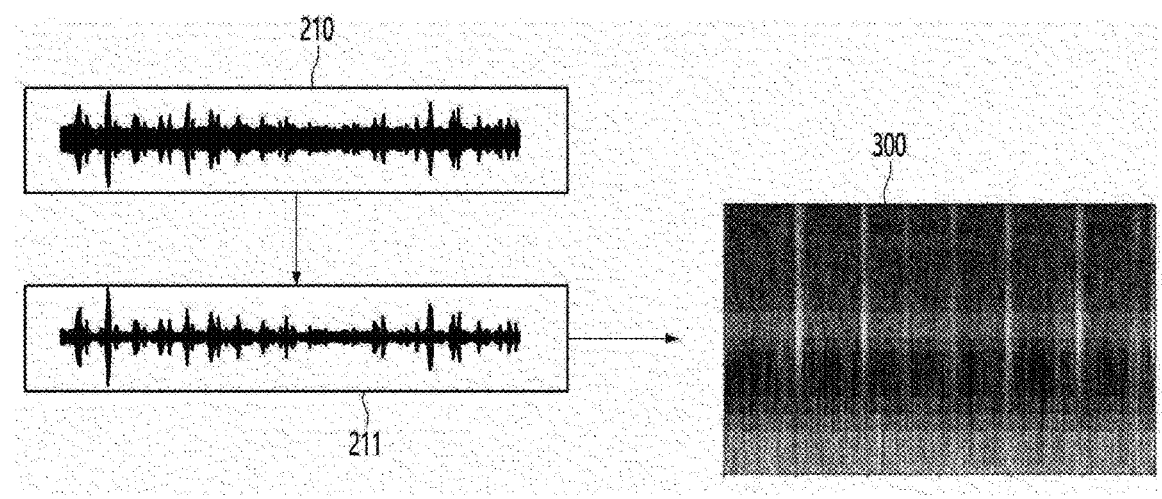

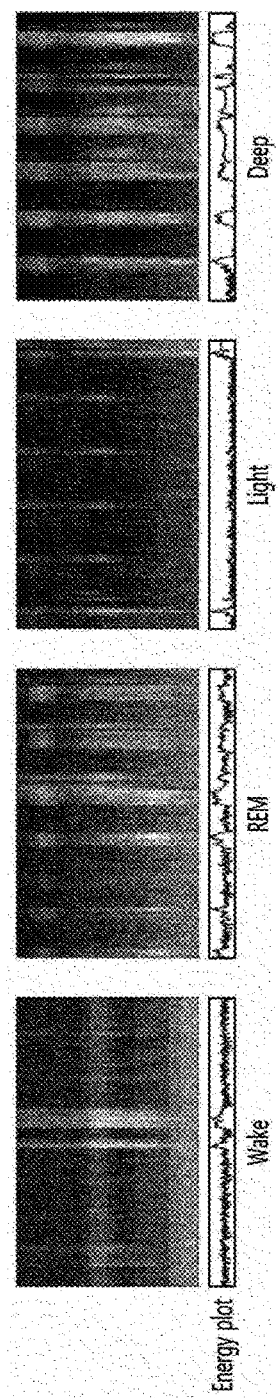
[FIG. 5]

[FIG. 6]
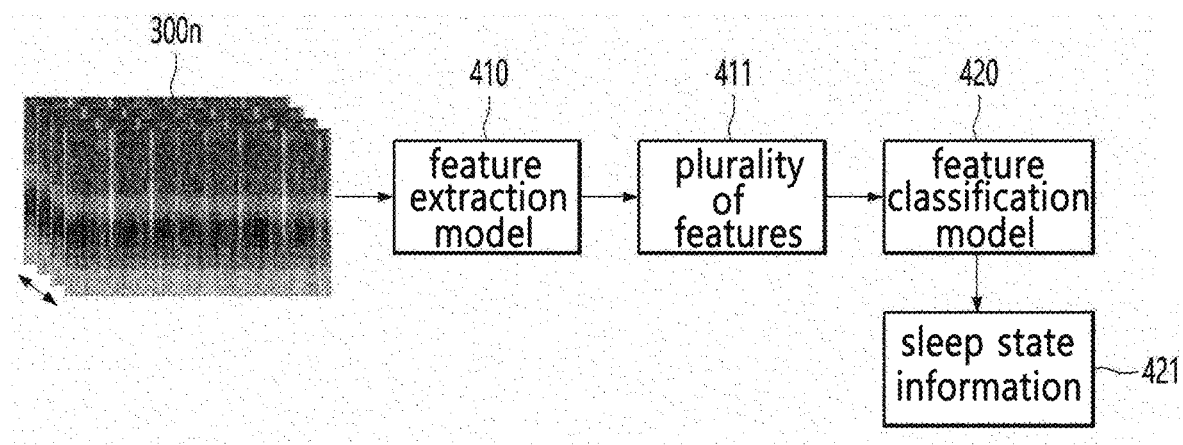
[FIG. 7]
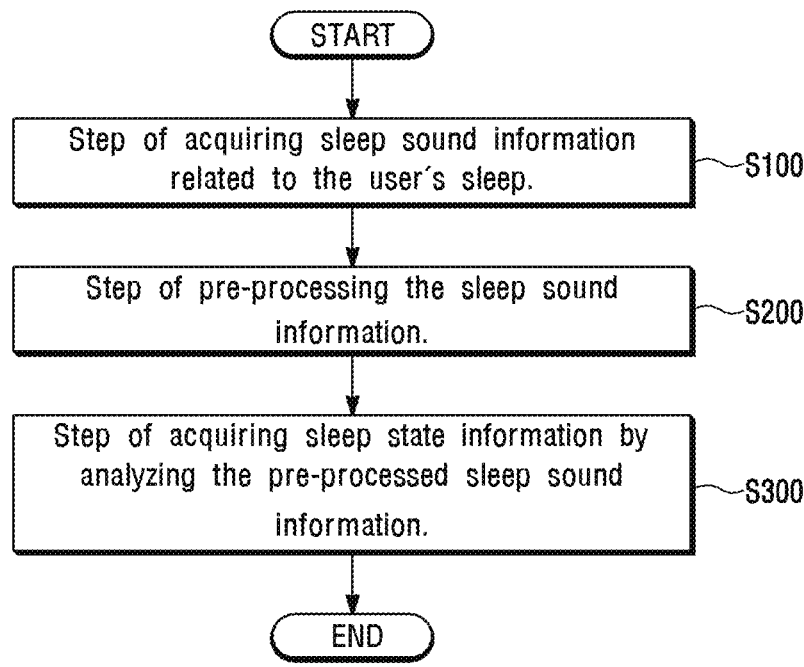

[FIG. 8]
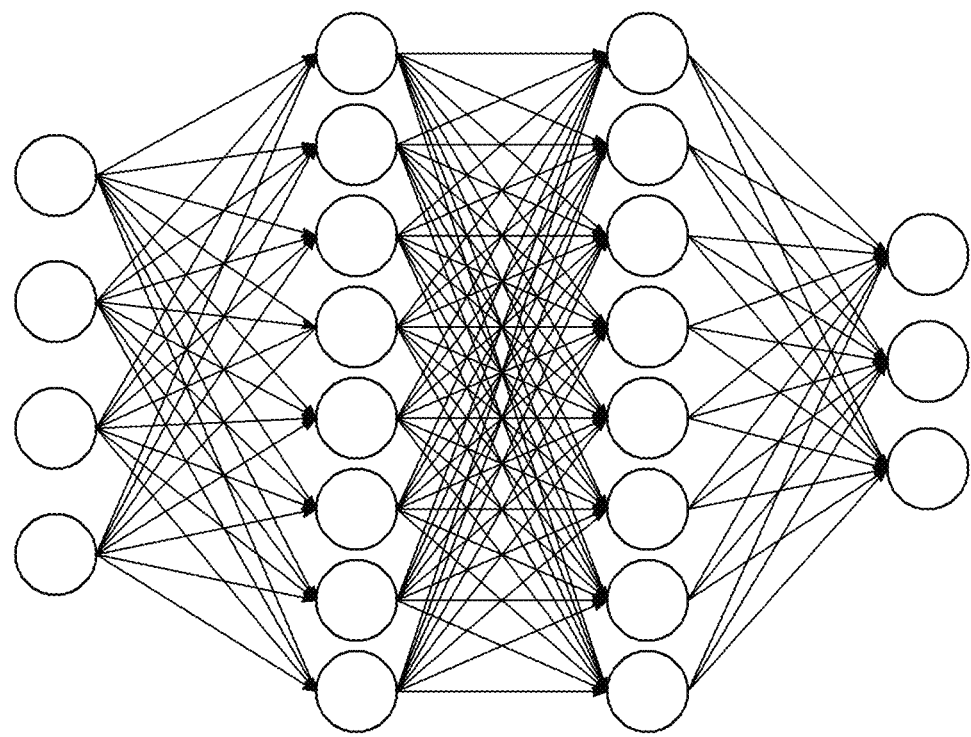

METHOD, COMPUTING APPARATUS, AND COMPUTER PROGRAM FOR ANALYZING SLEEPING STATE OF USER THROUGH SOUND INFORMATION

CROSS-REFERENCE TO RELATED PATENT APPLICATIONS

The present application is a U.S. national stage application under 35 U.S.C. § 371 of PCT Application No. PCT/KR2022/021760, filed Dec. 30, 2022, which claims priority to Korean Patent Application No. 10-2021-0194186, filed Dec. 31, 2021. The disclosures of the aforementioned priority applications are incorporated herein by reference in their entireties.

TECHNICAL FIELD

The present disclosure relates to analyzing a user's sleep state. More specifically, it relates to providing analysis information about sleep stages based on sound information acquired from the user's sleep environment.

BACKGROUND ART

Maintaining and improving health can be achieved through various means such as exercise, diet, etc. However, sleep occupies about 30% or more of time during a day. Therefore, managing sleep well is paramount in how to maintain and improve health.

Machines have replaced simple labor of modern people, and modern people are enjoying a leisurely life. Nevertheless, modern people cannot get a good night's sleep due to irregular eating habits, living habits, and stress. Modern people suffer from sleep disorders such as insomnia, hypersomnia, sleep apnea syndrome, nightmares, night terrors, sleepwalking, etc.

According to the National Health Insurance Service, the number of patients with sleep disorders in the Republic of Korea increased by about 8% annually from 2014 to 2018, and about 570,000 patients were treated for sleep disorders in the Republic of Korea in 2018.

As sound sleep is recognized as an important factor affecting physical or mental health, interest in sound sleep is increasing. However, in order to improve sleep disorders, people must visit a specialized medical institution, additional inspection costs are required, and continuous management is difficult. Accordingly, users' efforts for treatment are insufficient now.

Korean Patent Application Publication No. 2003-0032529 discloses a sleep induction device and a sleep induction method enabling optimal sleep induction. The sleep induction device and the sleep induction method receive a user's body information and repeatedly learns according to the user's body state during sleep. In addition, it outputs vibration and/or ultrasound of a frequency band detected by repetitive learning to enable optimal sleep induction.

However, the prior art has a concern that the quality of sleep may be reduced due to discomfort caused by the body-worn equipment. And periodic management of the equipment (e.g., charging, etc.) is required.

Accordingly, studies have recently been conducted to estimate sleep stages by non-contact monitoring the degree of activation of autonomic nervous systems according to breathing patterns and body movements at night.

However, in order to acquire information about breathing patterns and movements in a non-contact manner, that is, at a distance that does not affect movements during sleep, additional equipment (e.g., a radio wave measuring device for sensing movements) must be required.

Therefore, there is a demand for technology that allows easy acquisition of sound information related to sleep environment through user terminals (e.g., mobile devices) without needs for additional equipment, and that detects sleep states by analyzing sleep stages of a user based on the acquired sound information.

DETAILED DESCRIPTION OF THE INVENTION

Technical Tasks

The present disclosure was made in consideration of the above background art. This relates to providing information about sleep states by analyzing a user's sleep stages based on sound information detected in the user's sleep environment.

The tasks to be resolved by the present disclosure are not limited to the aforementioned, and others not mentioned will be clearly understood by those skilled in the art from the description below.

Technical Solutions

In accordance with an embodiment for resolving the above tasks, a method for analyzing a user's sleep state based on sound information is disclosed.

The method comprises the steps of: acquiring sleep sound information related to a user's sleep, pre-processing the sleep sound information, and acquiring sleep state information by analyzing the pre-processed sleep sound information, wherein the sleep state information includes sleep stage information related to the user's sleep depth.

In an alternative embodiment, the step of acquiring the sleep sound information comprises a step of identifying a singular point at which information of predetermined pattern is detected from living environment sound information, and a step of acquiring the sleep sound information based on the living environment sound information acquired with reference to the singular point.

In an alternative embodiment, the step of pre-processing the sleep sound information comprises a step of classifying the sleep sound information into one or more sound frames having a predetermined time unit, based on an energy level of each of the one or more sound frames, a step of identifying a minimum sound frame having a minimum energy level based on each energy level of the one of more sound frames, and a step of removing a noise of the sleep sound information based on the minimum sound frame.

In an alternative embodiment, the step of acquiring the sleep state information comprises a step of acquiring the sleep state information using a sleep analysis model including one or more network functions.

In an alternative embodiment, the sleep analysis model includes a feature extraction model that extracts one or more features for each predetermined epoch and a feature classification model that generates the sleep state information by classifying the extracted features into one or more sleep stages.

In an alternative embodiment, the step of acquiring the sleep state information comprises a step of generating a spectrogram corresponding to the sleep sound information and a step of acquiring the sleep state information by processing the spectrogram as an input of the sleep analysis model.

In an alternative embodiment, the method further comprises a step of performing data augmentation based on the preprocessed sleep sound information, wherein the data augmentation includes at least one of pitch shifting, Gaussian noise, loudness control, dynamic range control and spec augmentation.

In an alternative embodiment, the method further comprises the steps of receiving sleep plan information from a user terminal, generating external environment adjustment information based on the sleep plan information, and determining to transmit the external environment adjustment information to an environment adjustment unit.

In an alternative embodiment, the method further includes the steps of generating external environment adjustment information based on the sleep state information and determining to transmit the external environment adjustment information to an environment adjustment unit.

In another embodiment of the present invention, a computing device for analyzing a sleep state of a user based on sound information is disclosed. The computing device comprises a memory for storing one or more instructions, and a processor for executing the one or more instructions stored in the memory, wherein the processor analyzes the sleep state of the user based on the sound information by executing the one or more instructions.

In another embodiment of the present invention, a computer program stored in a computer readable storage medium is disclosed. The computer program is combined with a computer that is hardware and stored in a computer-readable storage medium to perform a method for analyzing a user's sleep state based on sound information.

Other specific details of embodiments of the present invention are included in the detailed description and drawings.

Technical Effects

The present disclosure has been made in consideration of the aforementioned prior art, and analysis information about a user's sleep state based on sound information acquired from a user's sleep environment can be provided according thereto.

The effects of the present disclosure are not limited to the effects mentioned above, and other effects not mentioned will be clearly understood by those skilled in the art from the description below.

BRIEF DESCRIPTION OF THE DRAWINGS

Various aspects are now depicted with reference to the drawings, in which like reference numerals collectively refer to like elements.

In the following embodiments, for explanation purposes, numerous specific details are set forth in order to provide thorough understandings of one or more aspects. However, it will be apparent that such aspect(s) may be practiced without these specific details.

FIG. 1 is a conceptual diagram illustrating a system in which various aspects of a computing device for analyzing a user's sleep state based on sound information related to an embodiment of the present invention may be implemented.

FIG. 2 is a block diagram of a computing device for analyzing a user's sleep state based on sound information related to an embodiment of the present invention.

FIG. 3 is an exemplary diagram for explaining a process of acquiring sleep sound information from living environment sound information related to an embodiment of the present invention.

FIG. 4 is an exemplary diagram for explaining a method of acquiring a spectrogram corresponding to sleep sound information related to an embodiment of the present invention.

FIG. 5 is an exemplary view illustrating a spectrogram related to each of various sleep stages related to an embodiment of the present invention.

FIG. 6 is an exemplary view illustrating a process of acquiring sleep state information based on a spectrogram related to an embodiment of the present invention.

FIG. 7 is a flowchart exemplarily illustrating a method for analyzing a user's sleep state based on sound information related to an embodiment of the present invention.

FIG. 8 is a schematic diagram illustrating one or more network functions related to one embodiment of the present invention.

DESCRIPTION OF EMBODIMENTS

The advantages and features of the present invention, and methods of achieving them will become clearer by referring to the following detailed description of embodiments and accompanying drawings.

However, the present invention is not limited to the embodiments disclosed below and may be implemented in a variety of different forms. These embodiments are provided only to make the disclosure of the present invention complete, and to fully inform those skilled in the art to which the present invention pertains of the scope of the present invention, and the present invention is defined solely by the scope of the claims.

Terms used herein is for describing the embodiments and is not intended to limit the present invention. In this specification, singular forms also include plural forms unless specifically stated otherwise in a phrase or sentence. As used herein, "comprises" and/or "comprising" does not exclude the presence or addition of one or more elements other than the recited elements. Like reference numerals throughout the specification refer to like elements, and "and/or" includes each and every combination of one or more of the recited elements. Although "first", "second", etc. are used to describe various elements, these elements are not limited by these terms, of course. These terms are only used to distinguish one element from another. Accordingly, it goes without saying that the first element mentioned below may also be the second element within the technological concepts of the present invention.

Unless otherwise defined, all terms (including technical and scientific terminology) used in this specification may be used with meanings commonly understood by those skilled in the art to which the present invention pertains. In addition, terms defined in commonly used dictionaries are not interpreted ideally or excessively unless explicitly specifically defined.

The term "unit" or "module" used in the specification means a software component and/or a hardware component such as FPGA or ASIC, and "unit" or "module" performs certain roles. However, "unit" or "module" is not meant to be limited to software or hardware. A "unit" or "module" may be configured to reside in an addressable storage medium and may be configured to reproduce one or more processors. Thus, as an example, a "unit" or "module" may refer to components such as software components, object-oriented software components, class components, and task components, as well as processes, functions, properties, procedures, subroutines, segments of program code, drivers, firmware, microcode, circuitry, data, databases, data structures, tables, arrays and variables. Functions provided within components and "units" or "modules" may be combined with smaller numbers of components and "units" or "modules", or may be divided into additional components and "units" or "modules".

In this specification, a computer means any kind of hardware device including at least one processor, and may be understood as encompassing a software configuration operating in a corresponding hardware device according to an embodiment. For example, the computer may be understood as including a smartphone, a tablet PC, a desktop computer, a laptop computer, and user clients and applications run on each device, but is not limited thereto.

Those skilled in the art should recognize that the various exemplary logical blocks, components, modules, circuits, means, logics, and algorithm steps described in connection with the embodiments disclosed herein may be implemented in electronic hardware, computer software, or combinations of both. To clearly illustrate the interchangeability of hardware and software, various illustrative components, blocks, configurations, means, logics, modules, circuits, and steps have been described above generally in terms of their functionality. Whether such functionality is implemented as hardware or as software depends on design constraints imposed on the particular application and the overall system. Skilled artisans may implement the described functionality in varying ways for each particular application. However, such implementation decisions should not be interpreted as causing a departure from the scope of the present invention.

Hereinafter, embodiments of the present invention will be described in detail with reference to the accompanying drawings.

The individual steps described in this specification is described as being performed by a computer, but the subject of each step is not limited thereto. Depending on embodiments, at least some of the steps may be performed in different devices.

FIG. 1 is a conceptual diagram illustrating a system in which various aspects of a computing device for analyzing a user's sleep state based on sound information related to an embodiment of the present invention may be implemented.

A system according to the embodiments of the present invention may include a computing device 100, a user terminal 10, an external server 20, and a network. The computing device 100, the user terminal 10, and the external server 20 in accordance with some embodiments of the present invention may mutually transmit and receive data for the system according to some embodiments of the present invention through the network.

The network according to the embodiments of the present invention may use various wired communication systems such as Public Switched Telephone Network (PSTN), xDSL (Digital Subscriber Line), RADSL (Rate Adaptive DSL), MDSL (Multi Rate DSL), VDSL (Very High Speed DSL), UADSL (Universal Asymmetric DSL), HDSL (High Bit Rate DSL), and Local Area Network (LAN).

Furthermore, the network according to some embodiments of the present invention may use various wireless communication systems such as Code Division Multi Access (CDMA), Time Division Multi Access (TDMA), Frequency Division Multi Access (FDMA), Orthogonal Frequency Division Multi Access (OFDMA), SC-FDMA (Single Carrier-FDMA) and other systems.

The network according to the embodiments of the present invention may be configured regardless of its communication mode, such as wired and wireless, and be composed of various communication networks such as a personal area network (PAN) and a wide area network (WAN). In addition, the network may be the known World Wide Web (WWW), or may use a wireless transmission technology used for short-range communication, such as Infrared Data Association (IrDA) or Bluetooth. The techniques described herein may be used in other networks as well as in the networks mentioned above.

According to an embodiment of the present invention, the user terminal 10 is the terminal capable of receiving information related to a user's sleep through information exchange with the computing device 100, and may refer to a terminal possessed by the user.

For example, the user terminal 10 may be the terminal related to the user who wants to improve health using information related to his or her sleep habits. The user may acquire information related to his or her sleep through the user terminal 10. The information related to sleep may include, for example, sleep state information 421 related to a change in sleep stage during sleep.

For example, the sleep state information 421 may refer to the information on when the user's sleep has changed to light sleep, normal sleep, deep sleep, or REM sleep at each time point during the user's 8-hour sleep last night. The detailed description of the aforementioned sleep state information 421 is only an example, and the present invention is not limited thereto.

The user terminal 10 may refer to any type of entity(-ies) in a system having a mechanism for communication with the computing device 100. For example, the user terminal 10 may include a personal computer (PC), a notebook computer, a mobile terminal, a smart phone, a tablet PC, an artificial intelligence (AI) speaker, artificial intelligence TVs and wearable devices. In addition, the user terminal 10 may include all types of terminals capable of accessing wired/wireless networks. In addition, the user terminal 10 may include an arbitrary server implemented by at least one of an agent, an application programming interface (API), and a plug-in. In addition, the user terminal 10 may include an application source and/or a client application.

According to an embodiment of the present invention, the external server 20 may be a server that stores information about a plurality of learning data for neural network learning. The plurality of learning data may include, for example, health examination information or sleep examination information.

For example, the external server 20 may be at least one of a hospital server and an information server, and may be a server that stores information about a plurality of polysomnography records, electronic health records, and electronic medical records. For example, the polysomnography records may include information about respiration and movement occurring during sleep of a subject for sleep examination and information about sleep diagnosis results (e.g., sleep stages, etc.) corresponding to the information. The information stored in the external server 20 may be used as learning data, verification data, and test data for learning the neural network in an embodiment of the present invention.

The computing device 100 in an embodiment of the present invention may receive health examination information or sleep examination information from the external server 20 and build a learning data set based on the information. As the computing device 100 learns about one or more network functions through the learning data set, the computing device 100 may generate a sleep analysis model for calculating sleep state information 421 corresponding to sleep sound information. A detailed description of the configuration of the learning data set for learning the neural network in an embodiment of the present invention and the learning method by using the learning data set will be described later with reference to FIG. 2.

The external server 20 may be a digital device, and may be a digital device equipped with a processor, memory, and arithmetic capability, such as a laptop computer, a notebook computer, a desktop computer, a web pad, and a mobile phone. The external server 20 may be a web server that processes services. The types of servers described above are only examples and the present invention is not limited thereto.

According to an embodiment of the present invention, the computing device 100 may acquire sleep sound information related to a user's sleep environment, and generate sleep state information 421 related to the user's sleep stage based on the sleep sound information. Specifically, the computing device 100 may be configured to include one or more network functions, and may generate sleep state information 421 by analyzing sleep sound information using a pre-learned neural network model (e.g., a sleep analysis model).

The sleep sound information used by the computing device 100 for sleep analysis may be related to sound information acquired in a non-invasive manner during the user's sleep. Specifically, the sleep sound information may include sounds that occur when the user tosses and turns during sleep, sounds related to muscle movements or sounds related to breathing of the user during sleep. That is, sleep sound information in an embodiment of the present invention may refer to sound information related to a movement pattern and a breathing pattern occurring during the user's sleep.

In an embodiment, sleep sound information may be acquired through the user terminal 10 possessed by the user. For example, sleep sound information related to the user's sleep environment may be acquired using a microphone module provided in the user terminal 10.

In general, since the microphone module provided in the user terminal 10 possessed by the user must be provided in the user terminal 10 having a relatively small size, it may be configured as a MEMS (Micro-Electro Mechanical System). The microphone module can be manufactured in a very small size, but it may have a lower signal-to-noise ratio (SNR) than a condenser microphone or a dynamic microphone. A low signal-to-noise ratio means that the ratio of a sound to be not identified compared to a sound to be identified, is high, which may mean that the sound is not easily identified (i.e., unclear).

An information subject to analysis in the present invention may be sound information related to breathing and movement of a user acquired during sleep, that is, sleep sound information. The sleep sound information is an information about very small sound (i.e., sounds that are difficult to distinguish) such as breathing and movement of the user. Therefore, since it is acquired together with other sounds in a sleep environment, detection and analysis may be very difficult when acquired through the microphone module having a low signal-to-noise ratio.

According to an embodiment of the present invention, the computing device 100 may provide the sleep state information 421 based on the sleep sound information acquired through a microphone module configured as a MEMS. Specifically, the computing device 100 may convert and/or adjust sleep sound data indistinctly acquired including a lot of noise into analytic data. Furthermore, the computing device 100 may perform learning an artificial intelligence neural network by utilizing the converted and/or adjusted data.

When the pre-learning of the artificial neural network is completed, the learned neural network (e.g., sound analysis model) may acquire the sleep state information 421 of the user based on data (e.g., spectrogram) acquired (e.g., converted and/or adjusted) corresponding to the sleep sound information. The sleep state information 421 may include information related to a change of the user's sleep stage during sleep.

Specifically, the sleep state information 421 may include information that the user was in REM sleep at a first time point and that the user was in light sleep at a second time point different from the first time point. In this case, based on the sleep state information 421, it is possible to acquire the information that the user fell into a relatively deep sleep at the first time point and had a lighter sleep at the second time point.

That is, when the computing device 100 acquires sleep sound information having a low signal-to-noise ratio through a user terminal (e.g., an artificial intelligence speaker, a bedroom IoT device, a mobile phone, etc.) that is generally provided to collect sounds, the computing device 100 may process the sleep sound information into data suitable for analysis, and provide sleep state information 421 related to a change in sleep stage by using the processed data.

Therefore, the user is not required to have a microphone in contact with the user's body to acquire a clear sound. In addition, the user can monitor a sleep state in a typical home environment with only a software update without purchasing an additional device with a high signal-to-noise ratio. Thus, it is possible to provide an effect of increasing convenience.

In an embodiment, the computing device 100 may be a terminal or a server, and may include any type of devices. The computing device 100 may be a digital device, and may be a digital device equipped with a processor and memory and arithmetic capability, such as a laptop computer, a notebook computer, a desktop computer, a web pad, and a mobile phone. The computing device 100 may be a web server that processes services. The types of servers described above are only examples and the present invention is not limited thereto.

According to an embodiment of the present invention, the computing device 100 may be a server providing a cloud computing service. More specifically, the computing device 100 may be a kind of Internet-based computing, and may be a server that provides a cloud computing service that processes information with another computer connected to the Internet, other than a user's computer.

The cloud computing service may be a service that stores data on the Internet and allows users to use the data stored on the Internet anytime and anywhere through Internet access without installing necessary data or programs on their computers. And it may share and transfer the stored data easily through just a click and a simple control.

In addition, the cloud computing service not only simply stores data in a server on the Internet, but also allows users to perform desired tasks by using the functions of application programs provided on the web without installing an additional program. It may be a service that allows co-working while sharing documents.

In addition, the cloud computing service may be implemented in the form of at least one of Infrastructure as a Service (IaaS), Platform as a Service (PaaS), Software as a Service (SaaS), virtual machine-based cloud server, and container-based cloud server. That is, the computing device 100 in an embodiment of the present invention may be implemented in the form of at least one of the aforementioned cloud computing services.

The specific description of the cloud computing service described above is just an example, and may include any platform for constructing the cloud computing environment in an embodiment of the present invention.

The specific configuration, technical features, and effects of the computing device 100 in an embodiment of the present invention will be described below with reference to FIGS. 2 to 8.

FIG. 2 is a block diagram of a computing device 100 for analyzing a user's sleep state based on sound information related to an embodiment of the present invention.

As shown in FIG. 2, a computing device 100 may include a network unit 110, a memory 120, a sensor unit 130, an environment adjustment unit 140, and a processor 150. The components included in the computing device 100 are examples, and the scope of the present invention is not limited to the aforementioned components. That is, additional components may be included or some of the above components may be omitted according to implementation aspects of the embodiments of the present invention.

According to one embodiment of the present invention, the computing device 100 may comprise a network unit 110. The computing device 100 may transmit and receive data with the user terminal 10 and the external server 20 through the network unit 110. The network unit 110 may transmit/receive data for performing a method of analyzing a sleep state based on sleep sound information according to an embodiment of the present invention to another computing device or server. That is, the network unit 110 may provide the computing device 100 with a function of communicating with the user terminal 10 and the external server 20.

For example, the network unit 110 may receive sleep examination records and electronic health records of a plurality of users from a hospital server. Additionally, the network unit 110 may allow the computing device 100 to transfer information with the user terminal 10 and the external server 20 by calling a procedure to the computing device 100.

The network unit 110 according to an embodiment of the present invention may use various wired communication systems such as Public Switched Telephone Network (PSTN), x Digital Subscriber Line (xDSL), Rate Adaptive DSL (RADSL), Multi Rate DSL (MDSL), and VDSL (Very High Speed DSL), Universal Asymmetric DSL (UADSL), High Bit Rate DSL (HDSL), and Local Area Network (LAN).

In addition, the network unit 110 presented in this specification may use wireless communication systems such as Code Division Multi Access (CDMA), Time Division Multi Access (TDMA), Frequency Division Multi Access (FDMA), Orthogonal Frequency Division Multi Access (OFDMA), SC-FDMA (Single Carrier-FDMA) and other systems.

In the present invention, the network unit 110 may be configured regardless of its communication mode, such as wired and wireless, and may be configured with various communication networks such as a personal area network (PAN) and a wide area network (WAN). In addition, the network unit 110 may be the known World Wide Web (WWW), and use a wireless transmission technology used for short-range communication such as Infrared Data Association (IrDA) or Bluetooth. The techniques described herein may be used in other networks as well as in the networks mentioned above.

According to an embodiment of the present invention, the memory 120 may store a computer program for performing a method of analyzing a sleep state based on sleep sound information according to an embodiment of the present invention. Furthermore, the stored computer program may be read and run by the processor 150.

The memory 120 may store any type of information generated or determined by the processor 150, and any type of information that the network unit 110 received. In addition, the memory 120 may store data related to the user's sleep.

For example, the memory 120 may temporarily or permanently store input/output data (e.g., sleep sound information related to the user's sleep environment, sleep state information 421 corresponding to the sleep sound information, etc.).

According to an embodiment of the present invention, the memory 120 may include at least one type storage medium among a flash memory, a hard disk, a multimedia card micro type memory, a card type memory (e.g., SD or XD memory, etc.), RAM (Random Access Memory, RAM), SRAM (Static Random Access Memory), ROM (Read-Only Memory, ROM), EEPROM (Electrically Erasable Programmable Read-Only Memory), PROM (Programmable Read-Only Memory), a magnetic memory, a magnetic disk, and an optical disk. The computing device 100 may operate in relation to a web storage that performs a storage function of the memory 120 on the Internet. The above description of the memory is only an example, and the present invention is not limited thereto.

According to an embodiment of the present invention, the sensor unit 130 may comprise one or more environment sensing modules for acquiring indoor environment information including at least one piece of information among the user's body temperature, room temperature, room airflow, room humidity, room sound, and room illuminance in relation to the user's sleep environment.

The indoor environment information may be information about the user's sleep environment. The indoor environment information, in a sleep state accompanied by a change in the user's sleep stage, may be the information that is a criterion for considering the influence of external factors on the user's sleep.

The one or more environment sensing modules may include, for example, at least one sensor module among a temperature sensor, an air flow sensor, a humidity sensor, a sound sensor, and an illuminance intensity sensor. However, they are not limited thereto, and may further include various sensors that may affect the user's sleep.

According to an embodiment of the present invention, the computing device 100 may adjust the user's sleep environment through the environment adjustment unit 140. Specifically, the environment adjustment unit 140 may include one or more environment adjustment modules. Furthermore, the environment adjustment unit 140 may adjust the user's sleep environment by operating an environment adjustment module related to at least one of temperature, wind direction, humidity, sound and illuminance based on the external environment control information received from the processor 150.

The external environment adjustment information may be a signal generated by the processor 150 based on determining a sleep state according to a change in a user's sleep stage. For example, it may be a signal for lowering the temperature, raising the humidity, lowering the intensity of illuminance, or lowering the sound in relation to the user's sleep environment. The specific description of the above environment control signal is only an example, and the present invention is not limited thereto.

The one or more environment adjustment modules may include, for example, at least one of a temperature control module, a wind direction control module, a humidity control module, a sound control module, and an illuminance intensity control module. However, they are not limited thereto, and one or more environment adjustment modules may further include various environment adjustment modules capable of bringing about changes to the user's sleep environment. That is, the environment adjustment unit 140 may adjust the user's sleep environment by driving one or more environment adjustment modules based on the environment control signal of the processor 150.

According to another embodiment of the present invention, the environment adjustment unit 140 may be implemented through linkage via the Internet of Things (JOT). Specifically, the environment adjustment unit 140 may be implemented in connection with various devices that can change the indoor environment in relation to the space where the user is located for his or her sleep.

For example, the environment adjustment unit 140 may be implemented as a smart air conditioner, a smart heater, a smart boiler, a smart window, a smart humidifier, a smart dehumidifier, and a smart lighting based on links through the Internet of Things. The specific description of the above-described environment adjustment unit is only an example, and the present invention is not limited thereto.

According to one embodiment of the present invention, the processor 150 may be composed of one or more cores. In addition, the processor 150 may include a processor for deep learning and analyzing data such as a central processing unit (CPU), a general-purpose graphics processing unit (GPGPU), and a tensor processing unit (TPU) of a computing device.

The processor 150 may read a computer program stored in the memory 120 and perform data processing for machine learning according to an embodiment of the present invention. The processor 150 may perform computations for learning the neural network according to an embodiment of the present invention.

The processor 150 may perform computations for learning the neural network, such as updating the weight of the neural network. The processor 150 may use processing of input data, feature extraction from input data, error calculation and backpropagation for learning in deep learning (DL).

In addition, at least one of the CPU, GPGPU, and TPU of the processor 150 may process learning of the network function. For example, the CPU and GPGPU may process learning of the network functions and data classification using the network functions.

In addition, in one embodiment of the present invention, the learning of a network function and data classification using the network function may be processed by using processors of a plurality of computing devices together. In addition, a computer program executed in a computing device according to an embodiment of the present invention may be a CPU, GPGPU or TPU executable program.

In this specification, network functions may be used interchangeably with artificial neural networks and neural networks. In this specification, a network function may include one or more neural networks, and in this case, an output of the network function may be an ensemble of outputs of one or more neural networks.

In this specification, a model may include a network function. A model may include one or more network functions, in which case an output of the model may be an ensemble of outputs of one or more network functions.

The processor 150 may provide a sleep analysis model according to an embodiment of the present invention by reading a computer program stored in the memory 120. According to an embodiment of the present invention, the processor 150 may perform computations based on sleep sensing data to derive sleep analysis information. According to an embodiment of the present invention, the processor 150 may perform computations for learning the sleep analysis model.

According to one embodiment of the present invention, the processor 150 may typically process overall operations of the computing device 100. The processor 150 processes input or output signals, data, information, etc. through the components described above, or runs an application program stored in the memory 120. Furthermore, the processor 150 may provide appropriate information or functions to the user terminal or process them.

According to an embodiment of the present invention, the processor 150 may acquire sleep sound information 210 related to the user's sleep. The acquiring the sleep sound information 210 according to an embodiment of the present invention may be acquiring or loading the sleep sound information stored in the memory 120.

In addition, the acquisition of sleep sound information may be to receive or load data from other storage media, other computing devices, or other processing module within the same computing device based on wired/wireless communication means.

The sleep sound information may be sound information acquired in a non-invasive manner during the user's sleep. Specifically, the sleep sound information may include sounds occurred when the user tosses and turns during sleep, sounds related to muscle movements, sounds related to breathing of the user during sleep, and the like. That is, the sleep sound information in the present invention may mean sound information related to a movement pattern and a breathing pattern occurring while the user is sleeping.

According to an embodiment, living environment sound information related to a space in which a user is present may be acquired through the user terminal 10 possessed by the user, and the processor 150 may acquire sleep sound information from the living environment sound information Here, the living environment sound information may be sound information acquired in a user's daily life. For example, the living environment sound information may include various sound information acquired according to a user's life, such as sound information related to cleaning, sound information related to cooking food, and sound information related to watching TV.

Specifically, the processor 150 may identify a singular point in which a preset pattern of information is detected in living environment sound information. Here, the preset pattern information may be related to breathing and movement patterns related to sleep.

For example, in the awake state, all neural systems are activated, resulting in irregular breathing patterns and increased body movements. Also, breathing sounds may be very low because the neck muscles are not relaxed.

On the other hand, when the user is sleeping, breathing is regularly changed, body movements may be reduced, and breathing sounds may be increased because of stabilization of an autonomic nervous system. Accordingly, the processor 150 may identify, as a singular point, the time point at which sound information according to a preset pattern related to regular breathing, small body movements, or small breathing sounds is detected in the living environment sound information.

In addition, the processor 150 may acquire sleep sound information based on the living environment sound information acquired on the basis of the identified singular point. The processor 150 may identify a singular point related to the user's sleeping time point in the living environment sound information acquired in a time-sequential manner, and acquire the sleep sound information based on the singular point.

For a specific example, referring to FIG. 3, the processor 150 may identify a singular point related to the time point at which a preset pattern is identified 201 from the living environment sound information 200. In addition, the processor 150 may acquire sleep sound information 210 based on sound information acquired after the identified singular point. A waveform and a singular point related to sounds in FIG. 3 are only examples for understanding the present invention, and the present invention is not limited thereto.

That is, the processor 150 may extract and acquire only sleep sound information from a vast amount of sound information by identifying a singular point related to the user's sleep from the living environment sound information. This allows the user to automate the process of recording his or her sleep time, thereby providing convenience and contributing to improving the accuracy of the acquired sleep sound information.

According to the embodiment, sleep sound information may be acquired through the user terminal 10 possessed by the user. For example, sleep sound information related to the user's sleep environment may be acquired through a microphone module provided in the user terminal 10.

In general, since the microphone module provided in the user terminal 10 possessed by the user must be provided in the user terminal 10 having a relatively small size, it may be configured as a MEMS (Micro-Electro Mechanical System). The microphone module can be manufactured in a very small size, but can have a lower signal-to-noise ratio (SNR) than a condenser microphone or a dynamic microphone. A low signal-to-noise ratio means that the ratio of a sound to be not identified compared to a sound to be identified, is high, which may mean that the sound is not easily identified (i.e., unclear).

The information subject to analysis in an embodiment of the present invention, may be sound information related to breathing and movements of a user acquired during sleep, that is, sleep sound information. Since the sleep sound information is information about very small sound such as the user's breathing and movements and is acquired along with other sounds in the sleep environment, detection and analysis thereof may be very difficult when acquired through the microphone module having a low signal-to-noise ratio. Accordingly, when the sleep sound information having a low signal-to-noise ratio is acquired, the processor 150 may convert it into data for process and/or analysis.

According to an embodiment, the processor 150 may perform preprocessing on the sleep sound information. The pre-processing of the sleep sound information may be a pre-processing of noise removal. Specifically, the processor 150 may classify the sleep sound information into one or more sound frames having a predetermined time unit. Also, the processor 150 may identify a minimum sound frame having a minimum energy level based on an energy level of each of one or more sound frames. The processor 150 may remove the noise of the sleep sound information based on the minimum sound frame.

As a specific example, the processor 150 may classify 30 seconds of sleep sound information into one or more very short 40 ms sound frames. Furthermore, the processor 150 may identify a minimum sound frame having a minimum energy level by comparing the size of each of a plurality of sound frames related to a size of 40 ms. The processor 150 may remove the identified minimum sound frame component from the entire sleep sound information (i.e., 30 seconds of the sleep sound information).

For example, referring to FIG. 4, as the minimum sound frame component is removed from the sleep sound information 210, a pre-processed sleep sound information 211 may be acquired. That is, the processor 150 may perform preprocessing for noise removal by identifying the minimum sound frame as a background noise frame and removing it from the original signal (i.e., sleep sound information).

According to an embodiment of the present invention, the processor 150 may acquire sleep state information 421 by analyzing the pre-processed sleep sound information. According to an embodiment, the sleep state information 421 may be information related to a sleep stage that changes during the user's sleep.

For example, the sleep state information 421 may refer to the information in which the user's sleep has changed to light sleep, normal sleep, deep sleep, or REM sleep at each point in time during the user's 8-hour sleep last night. The detailed description of the sleep state information 421 is only an example, and the present invention is not limited thereto.

Specifically, the processor 150 may generate a spectrogram corresponding to pre-processed sleep sound information. A process of generating the spectrogram corresponding to the pre-processed sleep sound information will be described below with reference to FIGS. 4 and 5.

The processor 150 may generate the spectrogram corresponding to the pre-processed sleep sound information 211. The processor 150 may generate the spectrogram corresponding to the pre-processed sleep sound information 211 by performing fast Fourier transform on the pre-processed sleep sound information 211.

The spectrogram may relate to grasping by visualizing sounds or waves, and may be a combination of characteristics of a waveform and a spectrum. The spectrogram may represent a difference in amplitude according to a change in a time axis and a frequency axis as a difference in print density or display color.

According to an embodiment of the present invention, the spectrogram generated by the processor 150 corresponding to the sleep sound information 210 may include a Mel spectrogram. As shown in FIG. 5, the processor 150 may acquire a Mel spectrogram through a Mel-Filter Bank as to the spectrogram.

In general, a human cochlea may have different parts that vibrate according to the frequency of sound data. In addition, the human cochlea has a characteristic of detecting a frequency change well in a low frequency band and not detecting a frequency change well in a high frequency band. Accordingly, it is possible to acquire the Mel spectrogram from the spectrogram by using the Mel-filter bank so as to have a recognition ability similar to that of the human cochlea for sound data.

So, the Mel-filter bank may be the one in which narrow filter banks are applied in a low frequency band and wider filter banks are applied in a higher frequency band. In other words, the processor 150 may acquire the Mel spectrogram by applying the Mel-filter bank to the spectrogram to recognize sound data similar to the characteristics of the human cochlea. The Mel spectrogram may include frequency components in which human hearing characteristics are reflected.

That is, in an embodiment of the present invention, the spectrogram which is generated corresponding to sleep sound information and is subject to analysis using a neural network may include the above-described Mel spectrogram.

In an embodiment of the present invention, sleep sound information may be related to sounds such as breathing, body movements, and may be a very small sound. Accordingly, the processor 150 may analyze the sounds by converting the sleep sound information into the spectrogram 300.

In this case, since the spectrogram 300 may include information showing how the frequency spectrum of sound changes over time, as described above, it is possible to easily identify a breathing or movement pattern corresponding to a relatively small sound. So, the analysis efficiency can be improved.

For example, as shown in FIG. 5, each spectrogram may be configured to have a frequency spectrum of different concentrations according to various sleep stages. That is, it may be difficult to predict at least one of an awake state, a REM sleep state, a light sleep state, and a deep sleep state by only changing the energy level of the sleep sound information, but by converting the sleep sound information into a spectrogram, each frequency change of a spectrum can be easily detected. Therefore, analyses corresponding to small sounds (e.g., breathing and body movements) can be implemented.

In addition, the processor 150 may acquire sleep state information 421 by processing the spectrogram 300 as an input of a sleep analysis model. Here, the sleep analysis model may be a model for acquiring sleep state information 421 related to a change in the user's sleep stage. In addition, the sleep analysis model may output sleep state information 421 by using, as an input, sleep sound information acquired during the user's sleep. In an embodiment, the sleep analysis model may include a neural network model implemented with one or more network functions.

A sleep analysis model may comprise one or more network functions. One or more network functions may comprise a set of interconnected computational units, which may generally be referred to as 'nodes'. The 'nodes' may also be referred to as 'neurons'. One or more network functions include at least one or more nodes. The nodes (or neurons) composing one or more network functions may be interconnected by one or more 'links'.

In a neural network, one or more nodes connected through a link may form a relative relationship of an input node and an output node. The concepts of input node and output node are relative. Therefore, an arbitrary node in an output node relationship with one node may be in an input node relationship with another node, and vice versa. As described above, the input node to output node relationship can be created around the link. More than one output node can be connected to one input node through a link, and vice versa.

In a relationship between an input node and an output node connected through one link, the value of the output node may be determined based on data input to the input node. In this case, a node interconnecting the input node and the output node may have a weight. The weight may be variable, and may be changed by a user or an algorithm in order to perform a function desired by the neural network. For example, when one or more input nodes are interconnected by respective links to one output node, the output node may determine an output node value based on values input in the input nodes connected to the output nodes and a weight which is set to a link corresponding to each input node.

As described above, one or more nodes are interconnected through one or more links to form an input node and output node relationship within the neural network. Characteristics of the neural network may be determined according to the number of nodes and links in the neural network, an association between the nodes and links, and a weight value assigned to each link. For example, when there are two neural networks having the same number of nodes and links and different weight values between the links, the two neural networks may be recognized as being different from each other.

Some of the nodes constituting the neural network may form a one layer based on distances from the first input node. For example, a set of nodes having a distance of n from the first input node may constitute n layers. The distance from the first input node may be defined by the minimum number of links that must be passed through to reach the corresponding node from the first input node. However, the definition of such a layer is arbitrary for explanation, and the order of a layer in a neural network may be defined in a method different from the above. For example, a layer of nodes may be defined by a distance from a final output node.

An initial input node may refer to one or more nodes to which data are directly input without going through a link in relation to other nodes among nodes in the neural network. Alternatively, in a relationship between nodes based on a link in the neural network, it may refer to nodes that do not have other input nodes connected by a link. Similarly, the final output node may refer to one or more nodes that do not have an output node in relation to other nodes among nodes in the neural network. Also, the hidden node may refer to nodes constituting the neural network other than the first input node and the final output node. A neural network according to an embodiment of the present invention may have more nodes of an input layer than nodes of a hidden layer close to an output layer, and may be a neural network in which the number of nodes decreases from the input layer to the hidden layer.

A neural network may include one or more hidden layers. A hidden node of a hidden layer may use outputs of the previous layer and outputs of neighboring hidden nodes as inputs. The number of hidden nodes for each hidden layer may be the same or different. The number of nodes of the input layer may be determined based on the number of data fields of the input data and may be the same as or different from the number of hidden nodes. The input data input to the input layer may be computed by a hidden node of the hidden layer and may be output by a fully connected layer (FCL) that is an output layer.

According to an embodiment of the present invention, the sleep analysis model may include a feature extraction model that extracts one or more features for each predetermined epoch and a feature classification model that generates sleep state information 421 by classifying each of the features extracted through the feature extraction model into one or more sleep stages. A process of acquiring the sleep state information 421 by using the sleep analysis model will be described below with reference to FIG. 6.

According to an embodiment, a feature extraction model 410 may analyze the time-sequential frequency patterns of the spectrogram 300 to extract features related to breathing sounds, breathing patterns, and movement patterns. In one embodiment, the feature extraction model 410 may be a neural network model (e.g., an autoencoder) pre-learned through a learning data set. Here, the learning data set may be composed of a plurality of spectrograms and a plurality of sleep stage information corresponding to each spectrogram.

In one embodiment, the feature extraction model 410 may be comprised of an encoder in an autoencoder learned through a learning data set. The Autoencoder may be learned through an unsupervised learning method. The autoencoder may be learned to output data similar to input data through a learning data set.

Specifically, the autoencoder may learn only essential feature data (or features) of the spectrogram input during an encoding process by the encoder through a hidden layer and discard the remaining information. In this case, output data of the hidden layer in a decoding process by a decoder may be an approximation of input data (i.e., a spectrogram) rather than a perfect copy value. The autoencoder may be learned to adjust a weight so that the output data and the input data are the same as possible.

In an embodiment, each of a plurality of spectrograms included in a learning data set may be tagged with sleep stage information. Each of the plurality of spectrograms may be input to an encoder, and an output corresponding to each spectrogram may be matched with tagged sleep stage information and stored.

Specifically, when the first learning data sets (i.e., a plurality of spectrograms) tagged with the first sleep stage information (e.g., light sleep) are input to the encoder using the encoder, features related to the output of the encoder for the corresponding input may be stored by matching with the first sleep stage information.

In an embodiment, one or more features related to an output of an encoder may be represented on a vector space. In this case, since the feature data output by corresponding to each of the first learning data sets are output through the spectrogram related to the first sleep stage, they may be located at a relatively close distance on the vector space. That is, the encoder may be learned so that the plurality of spectrograms output similar features corresponding to each sleep stage.

The encoder may be learned to extract features well that enable the decoder to restore the input data well. Accordingly, the feature extraction model 410 may be implemented through an encoder among learned autoencoders. The feature extraction model 410 may extract a plurality of features that can restore the input data (i.e., spectrograms) well.

When the spectrogram (e.g., a spectrogram converted in correspondence to sleep sound information) is input to the encoder constituting the feature extraction model 410 through the above-described learning process, the encoder may extract a feature corresponding to the spectrogram.

In an embodiment, the processor 150 may extract a feature by processing the spectrogram 300 generated corresponding to the sleep sound information 210 as an input of the feature extraction model 410. Here, since the sleep sound information 210 is time-sequential data acquired time-sequentially during the user's sleep, the processor 150 may divide the spectrogram 300 into predetermined epochs.

For example, the processor 150 may acquire a plurality of spectrograms 300n by dividing the spectrogram 300 corresponding to the sleep sound information 210 in units of 30 seconds. For example, when sleep sound information is acquired during the user's 7-hour (i.e., 420-minute) sleep, the processor 150 may acquire 140 spectrograms 300n by dividing the spectrogram in units of 30 seconds. The detailed numerical description of the sleep time, the division time unit of the spectrogram, and the number of divisions described above are only examples, and the present invention is not limited thereto.

The processor 150 may extract a plurality of features 411 corresponding to each of the plurality of spectrograms 300n by processing each of the divided spectrograms 300n as an input of the feature extraction model 410. For example, when the number of spectrograms is 140, the number of features 411 extracted by the feature extraction model 410 may also be 140 correspondingly. The above-described spectrogram and specific numerical description related to the number of a plurality of features are only examples, and the present invention is not limited thereto.

As shown in FIG. 6, the processor 150 may acquire the sleep state information 421 by inputting the plurality of features 411 output through the feature extraction model 410 into the feature classification model 420. In an embodiment, the feature classification model 420 may be a pre-learned neural network model to predict sleep stages corresponding to the features.

For example, the feature classification model 420 may include a fully connected layer, and may be a model that classifies a feature into at least one of sleep stages. For example, when the first feature corresponding to the first spectrogram is input, the feature classification model 420 may classify the corresponding first feature as a light sleep.

In an embodiment, the feature classification model 420 may perform a multi-epoch classification to predict sleep stages of several epochs by inputting spectrograms related to several epochs. It may be possible that the multi-epoch classification does not provide one sleep stage analysis information in response to a single epoch spectrogram (i.e., one spectrogram corresponding to 30 seconds), but estimates several sleep stages (e.g., a change in sleep stages according to a change in time) at once by taking spectrograms corresponding to multiple epochs (i.e., a combination of spectrograms each corresponding to 30 seconds) as inputs.

For example, since breathing patterns or movement patterns change slowly compared to an EEG (electroencephalogram) signal or other bio-signals, it is possible to accurately estimate sleep stages only by observing how the patterns change at the time points of the past and the future.

For example, the feature classification model 420 may take 40 spectrograms (e.g., 40 spectrograms corresponding to 30 seconds each) as inputs, and predict 20 spectrograms located in the middle. That is, all the spectrograms from 1 to 40 are looked at, but the sleep stage can be predicted through the classification corresponding to the spectrograms from 10 to 20. The detailed numerical description of the number of spectrograms described above is only an example, and the present invention is not limited thereto.

That is, in a process of estimating sleep stages, rather than performing sleep stage prediction in response to each single spectrogram, spectrograms corresponding to multiple epochs may be used as inputs so that both information related to the past and future can be considered. Thereby, the accuracy of the output can be improved.

As described above, the processor 150 may perform pre-processing on the sleep sound information acquired with a low signal-to-noise ratio, and acquire a spectrogram based on the pre-processed sleep sound information. In this case, conversion to the spectrogram may be performed to easily analyze breathing or movement patterns related to relatively small sounds.

In addition, the processor 150 may generate the sleep state information 421 based on the spectrogram acquired by using a sleep analysis model including a feature extraction model 410 and a feature classification model 420. In this case, the sleep analysis model may perform sleep stage prediction by taking spectrograms corresponding to a plurality of epochs as inputs so as to consider both past and future information. Therefore, the sleep analysis model may output more accurate sleep state information 421.

According to an embodiment of the present invention, the processor 150 may perform data augmentation based on the pre-processed sleep sound information. This data augmentation is intended to enable the sleep analysis model to output the sleep state information 421 robustly even when dealing with sounds measured in various domains (e.g., different bedrooms, different microphones, different arrangement locations, etc.). In an embodiment, data augmentation may include at least one of pitch shifting, gaussian noise, loudness control, dynamic range control, and spec augmentation.

According to an embodiment, the processor 150 may perform data augmentation related to pitch shifting based on sleep sound information. For example, the processor 150 may perform data augmentation by adjusting the pitch of the sound, such as raising or lowering the pitch of the sound at predetermined intervals.

The processor 150 may perform not only pitch shifting, but also Gaussian noise which performs data augmentation through noise-related calibration, and loudness control which performs data augmentation by calibrating sounds to give a feeling that sound quality is maintained even when the volume is changed. Furthermore, the processor 150 may perform dynamic range control that performs data augmentation by adjusting the dynamic range, which is a logarithmic ratio measured in dB between the maximum and minimum amplitudes of sounds, and spec augmentation related to the increase in sound specifications may also be performed.

That is, the processor 150 may improve the accuracy of sleep stage prediction by performing robust recognition in response to sleep sounds acquired in various environments through data augmentation of the sound information (i.e., sleep sound information) which forms the basis of the analysis in an embodiment of the present invention.

According to one embodiment of the present invention, the processor 150 may control an environment adjustment unit. Specifically, the processor 150 may generate external environment adjustment information related to illuminance adjustment, and may control the illuminance adjustment operation of the environment adjustment unit by determining to transmit the external environment adjustment information to the environment adjustment unit.

According to an embodiment, light may be one of representative factors that may affect the quality of sleep. For example, the quality of sleep may be positively or adversely affected depending on the intensity of light, color, degree of exposure, and the like. Accordingly, the processor 150 may improve the quality of the user's sleep by adjusting the illuminance.

For example, the processor 150 may monitor a situation before or after falling asleep, and adjust the illuminance to effectively wake up the user accordingly. That is, the processor 150 may identify the sleep state (e.g., sleep stage) and automatically adjust the illuminance to maximize the quality of sleep.

In one embodiment, the processor 150 may receive sleep plan information from the user terminal 10. The sleep plan information may be information generated by the user through the user terminal 10, and may include, for example, bedtime and wake-up time information. The processor 150 may generate external environment adjustment information based on the sleep plan information.

For a specific example, the processor 150 may identify a user's bedtime through sleep plan information and generate external environment adjustment information based on the bedtime. For example, the processor 150 may generate external environment adjustment information to provide 3000K white light with the illuminance of 30 lux based on the bed position 20 minutes before bedtime. That is, in relation to bedtime, it is possible to create the illuminance that induces the user to fall asleep naturally.

In addition, for example, the processor 150 may identify a wake-up time of the user through the sleep plan information, and generate external environment adjustment information based on the wake-up time. For example, the processor 150 may generate external environment adjustment information to gradually increase the intensity of white light of 3000K starting from 0 lux and reaching 250 lux based on the bed position 30 minutes before waking up. The external environment adjustment information may induce a user to wake up naturally and refreshed at a desired wake-up time.

In addition, the processor 150 may determine to transmit external environment adjustment information to an environment adjustment unit. That is, the processor 150 may improve the quality of a user's sleep by generating external environment adjustment information that allows the user to easily fall asleep or wake up naturally based on the sleep plan information.

In another embodiment, the processor 150 may generate external environment adjustment information based on the sleep state information 421. In an embodiment, the sleep state information 421 may include information about a change in the user's sleep stage that is acquired time-sequentially through analysis of sleep sound information.

For example, when the processor 150 identifies that the user has entered a sleep stage (e.g., light sleep) through the user's sleep state information 421, the processor 150 may generate the external environment adjustment information that minimizes the illuminance to create a dark room environment without light. That is, it is possible to improve the user's sleep efficiency by adjusting to the optimal illuminance for each sleep stage of the user, that is, the optimal sleep environment.

In addition, the processor 150 may generate external environment adjustment information to provide appropriate illuminance according to a change in the user's sleep stage during sleep. For example, the processor 150 may generate more diverse external environment adjustment information depending on the change in sleep stage. For example, the processor 150 may provide fine red light when the sleep stage changes from light sleep to deep sleep. Or, the processor 150 may lower the illuminance or supply blue light when the sleep stage changes from REM sleep to light sleep. This may automatically consider situations during sleep as well as before sleep or right after waking up. Therefore, this has an effect of maximizing the quality of sleep for the user by considering the entire sleep experience rather than a part of it.

In an additional embodiment, the processor 150 may generate recommended sleep plan information based on the sleep state information 421. Specifically, the processor 150 may acquire information on a change in the user's sleep stage (e.g., a sleep cycle) through the sleep state information 421, and may set an expected wake-up time based on the information.

For examples, usually the sleep cycle during sleep can go through stages of light sleep, normal sleep, deep sleep, or REM sleep. The processor 150 may determine the time after REM sleep as the optimal time at which the user can wake up feeling most refreshed, and determine the wake-up time after the REM sleep period. Thereby, the processor 150 may generate recommended sleep plan information. In addition, the processor 150 may generate external environment adjustment information according to the recommended sleep plan information, and determine to transmit the external environment adjustment information to the environment adjustment unit. Accordingly, the user may wake up naturally according to the recommended sleep plan information recommended by the processor 150. Since this is a time when the processor 150 recommends a wake-up time for the user according to the change in the user's sleep stage, and the user's fatigue may be minimized, it has an advantage of improving the user's sleep efficiency.

FIG. 7 is a flowchart exemplarily illustrating a method for analyzing a user's sleep state based on sound information related to an embodiment of the present invention.

According to an embodiment of the present invention, the method may comprise a step of acquiring sleep sound information related to the user's sleep (S100).

According to an embodiment of the present invention, the method may comprise a step of pre-processing the sleep sound information (S200).

According to one embodiment of the present invention, the method may comprise a step of acquiring sleep state information 421 by analyzing the pre-processed sleep sound information (S300).

The order of the steps shown in FIG. 7 described above may be changed as needed, and at least one or more steps may be omitted or added. That is, the above steps are only one embodiment of the present invention, and the scope of the present invention is not limited thereto.

FIG. 8 is a schematic diagram showing a network function related to an embodiment of the present invention.

A deep neural network (DNN) may refer to a neural network including a plurality of hidden layers in addition to an input layer and an output layer. Using the deep neural network can lead to identifying latent structures in a data. In other words, it can identify the latent structure of a photo, text, video, sound, or music (e.g., what objects are in the photo, what the content and emotion of the text are, what the content and emotion of the audio are, etc.).

A deep neural network may include convolutional neural networks (CNN), recurrent neural networks (RNNs), autoencoders, generative adversarial networks (GANs), and restricted Boltzmann machines (RBMs), deep belief network (DBN), Q network, U network, Siamese network, and the like. The description of the deep neural network described above is only an example, and the present invention is not limited thereto.

In one embodiment of the present invention, the network function may include an autoencoder. The autoencoder may be a type of artificial neural network for outputting output data similar to input data. The autoencoder may include at least one hidden layer, and an odd number of hidden layers may be disposed between input and output layers.

The number of nodes of each layer may be reduced from the number of nodes of the input layer to an intermediate layer called the bottleneck layer (encoding), and then be expanded symmetrically with the reduction from the bottleneck layer to the output layer (symmetrical to the input layer). Nodes of the dimensionality reduction layer and the dimensionality restoration layer may or may not be symmetrical.

The Autoencoders may perform non-linear dimensionality reduction. The number of input layers and output layers may correspond to the number of remaining sensors after pre-processing of input data.

In an autoencoder structure, the number of hidden layer nodes included in the encoder may decrease as a distance from the input layer increases. Since when the number of nodes in the bottleneck layer (the layer with the fewest nodes located between the encoder and decoder) is too small, a sufficient amount of information may not be transmitted, so more than a certain number (e.g., more than half of the input layer, etc.) may be maintained.

A neural network may be learned using at least one of supervised learning, unsupervised learning, and semi-supervised learning. The learning of the neural network may be to minimize errors in the output.

The learning of neural network means repeatedly inputting learning data into the neural network, calculating the output of the neural network for the learning data and the error of the target, and in a way to reduce the error, updating the weight of each node of the neural network by back-propagation in the input layer direction from the output layer of the neural network.

The supervised learning may use the learning data (i.e., labeled learning data) in which each learning data is labeled with a correct answer. In a case of unsupervised learning, a correct answer may not be labeled in each learning data.

That is, for example, learning data in a case of supervised learning regarding data classification may be data in which each learning data is labeled with a category. The labeled learning data may be input to a neural network, and an error may be calculated by comparing an output (category) of the neural network and the label of the learning data.

As another example, in a case of unsupervised learning for data classification, an error may be calculated by comparing input learning data with a neural network output. The calculated error may be back-propagated in a reverse direction (i.e., from the output layer to the input layer) in the neural network, and the connection weight of each node of each layer of the neural network may be updated according to the back-propagation.

The amount of change in a connection weight of each updated node may be determined according to a learning rate. The neural network's computation of input data and back-propagation of errors may constitute a learning cycle (epoch). The learning rate may be applied differently according to the number of iterations of the learning cycle of the neural network.

For example, a high learning rate may be used in the early stage of neural network learning to increase efficiency by allowing the neural network to quickly acquire a certain level of performance, and a low learning rate may be used in the late stage to increase accuracy.

In general, the learning data in neural network learning may be a subset of actual data (i.e., data to be processed by using the learned neural network). Accordingly, there may be a learning cycle in which errors for learning data decrease but errors for actual data increase. An overfitting is a phenomenon in which errors for actual data increase due to excessive learning on learning data.

For example, a phenomenon in which a neural network that has learned a cat by showing a yellow cat does not recognize that it is a cat when it sees a cat other than yellow may be a type of overfitting. The overfitting may act as a cause of increasing errors of machine learning algorithms. Various optimization methods may be used to prevent such overfitting.

In order to prevent the overfitting, methods such as increasing learning data, regularization, and omitting some nodes of a network in a process of learning may be applied.

Throughout this specification, a computational model, a neural network, a network function, and a neural network may be used interchangeably. (Hereinafter, it is unified and described as a neural network.) A data structure may include a neural network, and the data structure including the neural network may be stored in a computer readable medium.

The data structure including the neural network may also include data input to the neural network, weights of the neural network, hyperparameters of the neural network, data acquired from the neural network, an activation function associated with each node or layer of the neural network, and a loss function for learning the neural network. The data structure including the neural network may include any of the components described above.

In other words, the data structure including the neural network may be configured to include data input to the neural network, weights of the neural network, hyperparameters of the neural network, data acquired from the neural network, activation function associated with each node or layer of the neural network, loss function for learning the neural network, and any combination thereof.

In addition to the foregoing configurations, the data structure including the neural network may include any other information that determines the characteristics of the neural network. In addition, the data structure may include all types of data used or generated in a computational process of the neural network, but is not limited to the above.

A computer readable medium may include a computer readable recording medium and/or a computer readable transmission medium. A neural network may comprise a set of interconnected computational units, which may generally be referred to as nodes. These nodes may also be referred to as neurons. A neural network may include one or more nodes.

The method or the steps of algorithm described in related to an embodiment of the present invention may be directly implemented in hardware, a software module executed by hardware or a combination thereof. A software module may reside in random access memory (RAM), read only memory (ROM), erasable programmable ROM (EPROM), electrically erasable programmable ROM (EEPROM), flash memory, hard disk, removable disk, CD-ROM, or any form of computer readable recording medium well known in the art to which the present invention pertains.

Elements in an embodiment of the present invention may be stored in a medium by being implemented as a program (or application) to be executed in combination with a computer, which is hardware. Elements in an embodiment of the present invention may be implemented as software programming or as software components. Similarly, some of the embodiments may be implemented in a programming or scripting language such as C, C++, Java, assembler, etc., including various algorithms implemented as combinations of data structures, processes, routines, or other programming components. Functional aspects may be implemented in an algorithm running on one or more processors.

Those skilled in the art will understand that the various exemplary logical blocks, modules, processors, means, circuits, and algorithm steps described in relation to the embodiments disclosed herein may be implemented by electronic hardware, various forms of program or design code (referred to herein as "software" for convenience), or a combination of thereof.

To clearly illustrate this interchangeability of hardware and software, various exemplary components, blocks, modules, circuits, and steps have been described above generally related to their functionality. Whether such functionality is implemented as hardware or software depends on the design constraints imposed on a particular application and the overall system.

Those who skilled in the art may implement the described functionality in varying ways for each particular application, but such implementation decisions should not be interpreted as causing a departure from the scope of the present invention.

Various embodiments presented herein may be implemented as a method, apparatus, or article of manufacture using standard programming and/or engineering techniques. The term "article of manufacture" includes a computer program, carrier, or media accessible from any computer-readable device.

For example, computer-readable media include magnetic storage devices (e.g., hard disks, floppy disks, magnetic strips, etc.), optical disks (e.g., CDs, DVDs, etc.), smart cards, and flash memory devices (e.g., EEPROM, card, stick, key drive, etc.), but are not limited thereto. Additionally, various storage media presented herein include one or more devices and/or other machine-readable media for storing information. The term "machine-readable medium" includes, wireless channels and various other media that can store, hold, and/or transmit instruction(s) and/or data, but is not limited thereto.

It is to be understood that the specific order or hierarchy of steps in the processes presented is an example of exemplary approaches. Based upon design priorities, it is to be understood that the specific order or hierarchy of steps in the processes may be rearranged within the scope of the present invention. The accompanying method claims present elements of the various steps in a sample order, but are not meant to be limited to a specific order or hierarchy presented.

The description of the presented embodiments is provided to enable those who skilled in the art to use or practice the present invention. Various modifications to these embodiments will be apparent to those skilled in the art, and the general principles defined herein may be applied to other embodiments without departing from the scope of the present invention. Thus, the present invention is not to be limited to the embodiments presented herein, but is to be construed in the widest scope consistent with the principles and novel features presented herein.

EXPLANATION OF REFERENCE NUMERALS

10: User terminal
20: External server
100: Computing device
110: Network unit
120: Memory
130: Sensor unit
140: Environment adjustment unit
150: Processor
200: Living environment sound information
201: Singular point related to a point at which a preset pattern is identified
210: Sleep sound information
211: Pre-processed sleep sound information 300: Spectrogram
300n: Plurality of spectrograms
410: Feature extraction model
411: Plurality of features
420: Feature classification model
421: Sleep state information
S100: Step of acquiring sleep sound information related to a user's sleep
S200: Step of pre-processing the sleep sound information
S300: Step of acquiring sleep state information by analyzing the pre-processed sleep sound information

The invention claimed is:

1. A method for analyzing a sleep state of a user based on sleep sound information, comprising the steps of:
    acquiring the sleep sound information including a sound related to breathing and a body movement of the user through a microphone module provided in a user terminal;
    pre-processing, via a processor, the sleep sound information;
    converting, via the processor, the pre-processed sleep sound information to a plurality of spectrograms;
    acquiring, via the processor, sleep state information by processing the plurality of spectrograms as an input of a sleep analysis model including a feature extraction model and a feature classification model, wherein the feature extraction model includes one or more neural networks including an encoder pre-trained through an autoencoder and the feature classification model includes one or more neural networks including a fully connected layer in at least one of the one or more neural networks, and wherein the sleep analysis model has been trained with a learning data set including a plurality of training spectrograms each of which is tagged with sleep stage information;
    generating, via the processor, external environment adjustment information based on the sleep state information; and
    transmitting the external environment adjustment information to one or more environment adjustment units, the one or more environment adjustment units is configured to adjust a sleep environment of the user by operating one or more environment adjustment modules based on the external environment adjustment information,
    wherein the acquired sleep state information includes sleep stage information related to a sleep depth of the user,
    wherein each of the plurality of spectrograms corresponds to a predetermined epoch,
    wherein the one or more neural networks included in the feature extraction model are configured to extract a plurality of features each of which is based on each of the plurality of spectrograms, and
    wherein the one or more neural networks included in the feature classification model are configured to estimate a plurality of sleep stages which are based on the plurality of the features as the sleep stage information.

2. The method of claim 1, wherein at least one of the one or more neural networks of the feature extraction model and the one or more neural networks of the feature classification model includes at least one of: a convolutional neural network (CNN) model, recurrent neural networks (RNNs), generative adversarial networks (GANs), and a restricted Boltzmann machines (RBMs), deep belief network (DBN), a Q network, a U network or a Siamese network.

3. The method of claim 1, wherein the plurality of features are extracted by the one or more neural networks of the feature extraction model based on one or more patterns related to at least one of breathing sounds, breathing patterns, and movement patterns in each of the plurality of spectrograms.

4. The method of claim 1, wherein each of the plurality of sleep stages is estimated based on at least a sequence of features which comprises a plurality of sequential features among the plurality of features.

5. The method of claim 1, wherein the one or more environment adjustment modules is related to at least one of temperature, a wind direction, humidity, a sound and illuminance of the sleep environment of the user.

6. A device configured for analyzing a sleep state of a user based on sleep sound information, the device comprising:
    a memory;
    a microphone module configured to acquire the sleep sound information including a sound related to breathing and a body movement of the user; and
    a processor configured to:
    pre-process the sleep sound information;
    convert the pre-processed sleep sound information to a plurality of spectrograms;
    acquire sleep state information by processing the plurality of spectrograms as an input of a sleep analysis model including a feature extraction model and a feature classification model, wherein the feature extraction model includes one or more neural networks including an encoder pre-trained through an autoencoder and the feature classification model includes one or more neural networks including a fully connected layer in at least one of the one or more neural networks, and wherein the sleep analysis model has been trained with a learning data set including a plurality of training spectrograms each of which is tagged with sleep stage information;
    generate external environment adjustment information based on the sleep state information; and
    transmit the external environment adjustment information to one or more environment adjustment units, the one or more environment adjustment units is configured to adjust a sleep environment of the user by operating one or more environment adjustment modules based on the external environment adjustment information,
    wherein the acquired sleep state information includes sleep stage information related to a sleep depth of the user,
    wherein each of the plurality of spectrograms corresponds to a predetermined epoch,
    wherein the one or more neural networks included in the feature extraction model are configured to extract a plurality of features each of which is based on each of the plurality of spectrograms, and
    wherein the one or more neural networks included in the feature classification model are configured to estimate a plurality of sleep stages which are based on the plurality of the features as the sleep stage information.

7. The device of claim 6, wherein at least one of the one or more neural networks of the feature extraction model and the one or more neural networks of the feature classification model includes at least one of: a convolutional neural network (CNN) model, recurrent neural networks (RNNs), generative adversarial networks (GANs), and a restricted Boltzmann machines (RBMs), deep belief network (DBN), a Q network, a U network or a Siamese network.

8. The device of claim 6, wherein the plurality of features are extracted by the one or more neural networks of the feature extraction model based on one or more patterns related to at least one of breathing sounds, breathing patterns, and movement patterns in each of the plurality of spectrograms.

9. The device of claim 6, wherein each of the plurality of sleep stages is estimated based on at least a sequence of features which comprises a plurality of sequential features among the plurality of features.

10. The device of claim 6, wherein the one or more environment adjustment modules is related to at least one of temperature, a wind direction, humidity, a sound and illuminance of the sleep environment of the user.

11. A server comprising a sleep analysis model for analyzing a sleep state of a user based on sleep sound information including a sound related to breathing and a body movement of the user acquired through a microphone module provided in a user terminal, the server comprising:
  a memory; and
  a processor configured to:
  pre-process the sleep sound information;
  convert the pre-processed sleep sound information to a plurality of spectrograms;
  acquire sleep state information by processing the plurality of spectrograms as an input of a sleep analysis model including a feature extraction model and a feature classification model, wherein the feature extraction model includes one or more neural networks including an encoder pre-trained through an autoencoder and the feature classification model includes one or more neural networks including a fully connected layer in at least one of the one or more neural networks, and wherein the sleep analysis model has been trained with a learning data set including a plurality of training spectrograms each of which is tagged with sleep stage information;
  generate external environment adjustment information based on the sleep state information; and
  transmit the external environment adjustment information to one or more environment adjustment units, the one or more environment adjustment units is configured to adjust a sleep environment of the user by operating one or more environment adjustment modules based on the external environment adjustment information,
  wherein the acquired sleep state information includes sleep stage information related to a sleep depth of the user,
  wherein each of the plurality of spectrograms corresponds to a predetermined epoch,
  wherein the one or more neural networks included in the feature extraction model are configured to extract a plurality of features each of which is based on each of the plurality of spectrograms, and
  wherein the one or more neural networks included in the feature classification model are configured to estimate a plurality of sleep stages which are based on the plurality of the features as the sleep stage information.

12. The server of claim 11, wherein at least one of the one or more neural networks of the feature extraction model and the one or more neural networks of the feature classification model includes at least one of: a convolutional neural network (CNN) model, recurrent neural networks (RNNs), generative adversarial networks (GANs), and a restricted Boltzmann machines (RBMs), deep belief network (DBN), a Q network, a U network or a Siamese network.

13. The server of claim 11, wherein the plurality of features are extracted by the one or more neural networks of the feature extraction model based on one or more patterns related to at least one of breathing sounds, breathing patterns, and movement patterns in each of the plurality of spectrograms.

14. The server of claim 11, wherein each of the plurality of sleep stages is estimated based on at least a sequence of features which comprises a plurality of sequential features among the plurality of features.

15. The server of claim 11, wherein the one or more environment adjustment modules is related to at least one of temperature, a wind direction, humidity, a sound and illuminance of the sleep environment of the user.

16. A computer-readable recording medium recording a computer program for executing the method for analyzing the sleep state of the user based on the sound information according to claim 1.

17. A computer-readable recording medium recording a computer program for executing the method for analyzing the sleep state of the user based on the sound information according to claim 2.

18. A computer-readable recording medium recording a computer program for executing the method for analyzing the sleep state of the user based on the sound information according to claim 3.

19. A computer-readable recording medium recording a computer program for executing the method for analyzing the sleep state of the user based on the sound information according to claim 4.

20. A computer-readable recording medium recording a computer program for executing the method for analyzing the sleep state of the user based on the sound information according to claim 5.

* * * * *